US010011362B2

(12) United States Patent
Piesker (10) Patent No.: US 10,011,362 B2
(45) Date of Patent: Jul. 3, 2018

(54) AIRCRAFT OUTER SKIN HEAT EXCHANGER, AIRCRAFT COOLING SYSTEM AND METHOD FOR OPERATING AN AIRCRAFT OUTER SKIN HEAT EXCHANGER

(71) Applicant: AIRBUS OPERATIONS GMBH, Hamburg (DE)

(72) Inventor: Markus Piesker, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 238 days.

(21) Appl. No.: 13/893,973

(22) Filed: May 14, 2013

(65) Prior Publication Data

US 2013/0331019 A1    Dec. 12, 2013

Related U.S. Application Data

(63) Continuation of application No. PCT/EP2011/005733, filed on Nov. 14, 2011.
(Continued)

(30) Foreign Application Priority Data

Nov. 16, 2010 (DE) .................. 10 2010 051 517

(51) Int. Cl.
*B64D 13/08* (2006.01)
*B64D 13/00* (2006.01)
(Continued)

(52) U.S. Cl.
CPC ............ *B64D 13/08* (2013.01); *B64D 13/00* (2013.01); *F28D 1/024* (2013.01); *F28D 7/08* (2013.01);
(Continued)

(58) Field of Classification Search
CPC ................................ B64D 13/00; B64D 13/08
(Continued)

(56) References Cited

U.S. PATENT DOCUMENTS 2,168,166 A * 8/1939 Larrecq .................. B64D 33/10
165/44
3,740,905 A * 6/1973 Adams .......................... 165/231
(Continued)

FOREIGN PATENT DOCUMENTS

DE          102 07 025       8/2003
DE     10 2008 026 536     12/2009
(Continued)

OTHER PUBLICATIONS

Piesker, WO 2010/012684 A1 English machine translation, Feb. 4, 2010.*
(Continued)

*Primary Examiner* — Alissa Tompkins
*Assistant Examiner* — Phillip E Decker
(74) *Attorney, Agent, or Firm* — Dickinson Wright PLLC (57) ABSTRACT

An aircraft outer skin heat exchanger includes a first cooling air inlet and a first cooling air duct section, in which a first heat carrier fluid duct section is arranged. A cooling air conveying device is configured to convey a cooling air stream in such a way through the first cooling air inlet and the first cooling air duct section that the cooling air stream is subdivided by a first heat carrier fluid duct section, arranged in the first cooling air duct section, into two partial air streams which flow through the first cooling air duct section substantially parallel to one another and in the same direction.

12 Claims, 8 Drawing Sheets

Related U.S. Application Data (60) Provisional application No. 61/414,016, filed on Nov. 16, 2010.

(51) Int. Cl.
| | |
|---|---|
| *F28D 7/08* | (2006.01) |
| *F28F 13/06* | (2006.01) |
| *F28F 1/02* | (2006.01) |
| *F28D 1/02* | (2006.01) |
| *F28D 21/00* | (2006.01) |

(52) U.S. Cl.
CPC ............... *F28F 1/02* (2013.01); *F28F 1/022* (2013.01); *F28F 13/06* (2013.01); *F28D 2021/0021* (2013.01); *Y02T 50/56* (2013.01)

(58) Field of Classification Search
USPC .......................................................... 454/76
See application file for complete search history.

(56) References Cited

U.S. PATENT DOCUMENTS

| | | | | |
|---|---|---|---|---|
| 3,776,305 | A * | 12/1973 | Simmons | 165/104.25 |
| 4,739,823 | A * | 4/1988 | Howard | B64D 13/00 165/104.34 |
| 4,819,720 | A * | 4/1989 | Howard | 165/104.34 |
| 5,025,917 | A * | 6/1991 | Smith | B65G 39/09 198/842 |
| 5,114,100 | A * | 5/1992 | Rudolph et al. | 244/134 C |
| 5,386,952 | A * | 2/1995 | Nordstrom et al. | 244/118.1 |
| 5,423,498 | A * | 6/1995 | Fluegel | 165/41 |
| 5,950,710 | A | 9/1999 | Liu | |
| 6,651,929 | B2 * | 11/2003 | Dionne | B64D 33/08 165/44 |
| 7,128,141 | B2 * | 10/2006 | Ping | B60H 1/10 454/75 |
| 9,309,000 | B2 * | 4/2016 | Piesker | B64D 13/00 |
| 2005/0062315 | A1 | 3/2005 | Andritter | |
| 2008/0302910 | A1 * | 12/2008 | Calamvokis | 244/118.5 |
| 2009/0189018 | A1 * | 7/2009 | Dittmar | B64D 13/08 454/76 |
| 2010/0024438 | A1 * | 2/2010 | Hoffjann et al. | 62/3.4 |
| 2011/0146957 | A1 | 6/2011 | Buchholz | |
| 2011/0186263 | A1 | 8/2011 | Piesker | |
| 2012/0160445 | A1 | 6/2012 | Baumgardt | |
| 2013/0283816 | A1 * | 10/2013 | Smith | B64C 39/024 60/784 |
| 2014/0369812 | A1 * | 12/2014 | Caruel | F02K 3/06 415/116 |
| 2015/0027676 | A1 * | 1/2015 | Eilken | B64D 13/00 165/168 |

FOREIGN PATENT DOCUMENTS

| | | |
|---|---|---|
| DE | 10 2009 013 159 | 9/2010 |
| DE | 10 2009 048 459 | 2/2011 |
| GB | 523245 | 7/1940 |
| GB | 570615 | 7/1945 |
| KR | 1020090012969 A * | 2/2009 |
| RU | 2064135 C1 * | 7/1996 |
| WO | 2008/140972 | 11/2008 |
| WO | 2010/012684 | 2/2010 |

OTHER PUBLICATIONS

Piesker, Markus, WO 2010/012684 A1 human English translation, Feb. 4, 2010.*

Park, KR 10-2009-0012969 A English machine translation, Feb. 4, 2009.*

* cited by examiner

FIG 6
View W

FIG 7
Section B-B

FIG 8
Section C-C

FIG 9
Section A-A

FIG 10

FIG 11
Section D-D

FIG 14

FIG 15 too long is arranged in such a way in the first cooling air duct section, and the cooling air conveying device conveys the cooling air in such a way through the first cooling air duct section, that the cooling air flowing through the first cooling air duct section flows over at least two surface regions of the first heat carrier fluid duct section.

This ensures particularly efficient heat exchange between the heat carrier fluid flowing through the first heat carrier fluid duct section and to be cooled and the cooling air flowing the first cooling air duct section. Consequently, the aircraft outer skin heat exchanger can be advantageously employed in an aircraft cooling system which has to remove large quantities of heat from an aircraft device to be cooled. Furthermore, the aircraft outer skin heat exchanger can be employed effectively for cooling the heat carrier fluid flowing through the first heat carrier fluid duct section even if the temperature of the cooling air is only a little lower than the temperature of the heat carrier fluid flowing through the first heat carrier fluid duct section.

In a preferred embodiment, the aircraft outer skin heat exchanger according to the invention comprises a second cooling air inlet, which is connected to a second cooling air duct section. Preferably, a first heat carrier fluid duct section, through which a heat carrier fluid to be cooled flows during the operation of the aircraft outer skin heat exchanger, is arranged in the first cooling air duct section. The cooling air conveying device is preferably configured to convey a cooling air stream in such a way through the second cooling air inlet and the second cooling air duct section that the cooling air stream is subdivided by the second heat carrier fluid duct section, arranged in the second cooling air duct section, into two partial cooling air streams which flow through the second cooling air duct section substantially parallel to one another and in the same direction.

With such a configuration of the aircraft outer skin heat exchanger according to the invention, the cooling air flows through the cooling air duct sections preferably in opposite directions in the direction of the cooling air discharge duct connected to both cooling air duct sections. Preferably, the cooling air discharge duct is connected at a central position to the first and to the second cooling air duct section, so that the cooling air flowing through the first cooling air duct section covers substantially the same distance as the cooling air flowing through the second cooling air duct section. The same cooling air conveying device can be used for conveying the cooling air through the first cooling air duct section as for conveying the cooling air through the second cooling air duct section. If desired or required, however, separate cooling air conveying devices can also be employed for conveying the cooling air through the first and second cooling air duct section.

The first and/or the second cooling air inlet can be of slit-shaped form and extend, in the state of the aircraft outer skin heat exchanger when mounted in an aircraft, parallel or perpendicularly to a longitudinal axis of the aircraft. The air inlets can be between 10 mm and 30 mm wide. Their length is determined by the cooling air mass flow required and the cross-section, through which flow can take place, of the cooling air duct sections. If the aircraft outer skin heat exchanger according to the invention has two cooling air inlets, the first and the second cooling air inlet preferably extend parallel to one another. Two cooling air inlets oriented parallel to one another and parallel to a longitudinal axis of the aircraft have the advantage that, even if the cooling air conveying device fails, a certain cooling air stream can be provided through the aircraft outer skin heat exchanger, since surrounding air flows owing to free convection through a lower cooling air inlet into the aircraft outer skin heat exchanger, then flows upwards along the cooling air duct sections and finally leaves the aircraft outer skin heat exchanger again through an upper cooling air inlet.

In a preferred embodiment of the aircraft outer skin heat exchanger according to the invention, an outer surface of the first and/or of the second cooling air duct section is formed by an outer skin of the aircraft. By contrast, an inner surface of the first and/or of the second cooling air duct section is preferably formed by an inner wall, facing an interior space of the aircraft, of the aircraft outer skin heat exchanger. Such a configuration of the aircraft outer skin heat exchanger is distinguished by its aerodynamically favourable properties, since it increases the aerodynamic drag of the aircraft only insignificantly or not at all. Furthermore, with such a configuration of the aircraft outer skin heat exchanger, the cooling air conveying device can be arranged in an unpressurised region of the aircraft, so that the cooling air does not have to be routed into the pressurised region of the aircraft. Costly sealing of cooling air conduits routed into the pressurised region of the aircraft can then be dispensed with.

Preferably, a heat carrier fluid conveying device is configured to convey the heat carrier fluid, flowing through the first and/or the second heat carrier fluid duct section, through the first and/or the second heat carrier fluid duct section substantially perpendicularly to the flow direction of the cooling air through the first and/or the second cooling air duct section. In other words, in the aircraft outer skin heat exchanger according to the invention, the cooling air and heat carrier fluid are guided in a cross-current flow.

A flow duct, formed in the first and/or the second heat carrier fluid duct section, for the heat carrier fluid flow flowing through the first and/or the second heat carrier fluid duct section can be of meander-shaped form and enable at least a single diversion by 180° of the heat carrier fluid flow flowing through the first and/or the second heat carrier fluid duct section. Such a configuration of the first and/or of the second heat carrier fluid duct section enables a guidance of the cooling air flow and heat carrier fluid flow in a cross-countercurrent flow, thereby enabling greater heating of the cooling air. This is advantageous particularly if the difference between the temperature of the cooling air and the temperature of the heat carrier fluid is low. The meander-shaped flow duct can be formed by placing flow-diverting partition walls in the heat carrier fluid duct section. The partition walls can be designed as continuous partition walls, with the exception of defined flow-diverting regions. If desired, however, the partition walls can also be provided with passages, thereby enabling heat carrier fluid to be directed at various positions from one region of the flow duct into a neighbouring region of the flow duct and be mixed with the heat carrier fluid flowing through the neighbouring region. Partition walls placed in the first and/or the second heat carrier fluid duct section have not only a flow-diverting action, but also increase the pressure resistance of the first and/or of the second heat carrier fluid duct section.

The first and/or the second heat carrier fluid duct section can comprise at least one flat pipe. A flat pipe is distinguished by good heat transfer properties. If the flat pipe is configured with a meander-shaped flow duct with corresponding partition walls, the flat pipe also has a high pressure resistance. The flow cross-section of a suitable flat pipe can be, for example, 1 mm to 5 mm×50 mm to 400 mm, i.e. the flat pipe has a very small thickness (extent in the y-direction), a small height (extent in the z-direction), but a comparatively great length (extent in the x-direction). Preferably, the flat pipe is provided on its outer surfaces with cooling fins or cooling ribs. The cooling ribs or cooling fins can extend, for example, substantially parallel to the flow direction of the cooling air through the first and/or the second cooling air duct section. Furthermore, the cooling ribs preferably extend substantially perpendicularly to the flow direction of the heat carrier fluid through the first and/or the second heat carrier fluid duct section. If desired, a plurality of flat pipes can be interconnected to form the heat carrier fluid duct section. The flat pipes can be provided with heat-conducting pins or plates or be welded together leak-tightly, in order to control the heat carrier properties of the first and/or of the second heat carrier fluid duct section as desired. If the first and/or the second heat carrier fluid duct section comprises/comprise a plurality of flat pipes, the flat pipes are preferably interconnected by hoses in order to enable simple compensation for tolerances.

The aircraft outer skin heat exchanger according to the invention preferably comprises a plurality of bearing devices for supporting the first and/or the second heat carrier fluid duct section on a structural component of the aircraft. The structural component of the aircraft can be a frame or a stringer of the aircraft structure, but also another component fixed to the aircraft structure. Preferably, only one of the bearing devices is designed as a fixed bearing. The other bearing devices, by contrast, are preferably designed as movable bearings. If desired, the bearing device designed as a fixed bearing can be rotatably designed. This can be realised, for example, by mounting the fixed bearing on a ball. Three bearings, for example, can be used to support the first and/or the second heat carrier fluid duct section, i.e. two lateral bearings and a central bearing. Furthermore, intermediate bearings can be provided, if necessary. Preferably, the central bearing is designed as a fixed bearing, since with such a configuration the smallest thermal movements and good compensation for deformations of the aircraft fuselage are to be expected. The fixed bearing has no degrees of freedom for movement in the x-, y- or z-direction. Intermediate bearings are preferably designed such that they always provide support in the y-direction, but never in the x-direction. The bearing capacity of the intermediate bearings in the z-direction is preferably defined according to static considerations.

The bearing devices can comprise a bearing component configured in the form of a bow or a profile which can be welded on the heat carrier fluid duct section to be supported and screwed to a structural component of the aircraft. The bearing component is preferably shaped such that it is capable of supporting a covering of the aircraft outer skin heat exchanger forming the outer surface or the inner surface of the first and/or of the second cooling air duct section.

Alternatively or additionally to this, it is possible to bore, in the y-direction, through a heat carrier fluid duct section to be supported, preferably in the middle, i.e. in the region of the neutral axis of the heat carrier fluid duct section. In the region of this bore, a bush can be welded in and the heat carrier fluid duct section to be supported can be fixed to a structural component of the aircraft by this bush. For example, a welded connection to a structural component of the aircraft can be produced by the bush. Alternatively to this, a suitable fastening means, such as example a screw or a rivet, can be passed through the bush and connected to the structural component of the aircraft. With such a configuration, the bush projects through the flow cross-section of the heat carrier fluid duct section to be supported. The bush is then preferably dimensioned such that the flow cross-section is only slightly reduced. The bush projecting into the flow cross-section can, however, produce turbulence in the heat carrier fluid flow flowing through the heat carrier fluid duct section, which can improve the heat carrier from the heat carrier fluid to the cooling air.

Bearing devices for supporting the first and/or the second heat carrier fluid duct section are preferably designed such that the heat carrier fluid duct section to be supported can be supported in a low-vibration and damping manner. In this way, relative movements between the heat carrier fluid duct section to be supported and the aircraft fuselage are to be compensated for in a low-stress manner. Suitable rubber and/or plastic elements, which enable a low-vibration and damping support of the heat carrier fluid duct section to be supported, are therefore preferably employed in the bearing devices. For example, the heat carrier fluid duct section to be supported can be clamped between such rubber or plastic elements.

The bearing devices for supporting the first and/or the second heat carrier fluid duct section are preferably designed such that, in the event of failure of a bearing, the heat carrier fluid duct section to be supported is held in its position by the other bearings. This can be achieved by corresponding higher dimensioning of the movable bearings and the intermediate bearings or by providing additional intermediate bearings. Additionally or alternatively to this, provision can be made for a locking device in the form of blocking elements which, even in the event of failure of the fixed bearing, hold the heat carrier fluid duct section, to be supported, in the x-direction. Preferably, the blocking elements enable a slight movement of the heat carrier fluid duct section, to be supported, in the x-direction, i.e. the blocking elements ensure a floating mounting of the entire bearing assembly.

An aircraft cooling system according to the invention comprises an above-described aircraft outer skin heat exchanger.

In a method according to the invention for operating an aircraft outer skin heat exchanger, a cooling air stream is conveyed by means of a cooling air conveying device through a first cooling air inlet and a first cooling air duct section of the aircraft outer skin heat exchanger, in the process, the cooling air stream conveyed through the first cooling air duct section is subdivided by a first heat carrier fluid duct section, arranged in the first cooling air duct section, into two partial cooling air streams which flow through the first cooling air duct section substantially parallel to one another and in the same direction.

Preferably, in the method according to the invention, a cooling air stream is furthermore directed by means of the cooling air conveying device through a second cooling air inlet and a second cooling air duct section, the cooling air stream conveyed through the second cooling air duct section being subdivided by a second heat carrier fluid duct section, arranged in the second cooling air duct section, into two partial cooling air streams which flow through the second cooling air duct section substantially parallel to one another and in the same direction.

A heat carrier fluid conveying device conveys the heat carrier fluid, flowing through the first and/or the second heat carrier fluid duct section, through the first and/or the second heat carrier fluid duct section preferably substantially perpendicularly to the flow direction of the cooling air through the first and/or the second cooling air duct section.

The heat carrier fluid flow flowing through the first and/or the second heat carrier fluid duct section is preferably directed in a meander-shaped manner through the first and/or the second heat carrier fluid duct section and undergoes at least a single diversion by 180°.

BRIEF DESCRIPTION OF DRAWINGS

Preferred embodiments of the invention will now be explained in more detail with the aid of the appended schematic figures, of which

DETAILED DESCRIPTION

Figure 1:
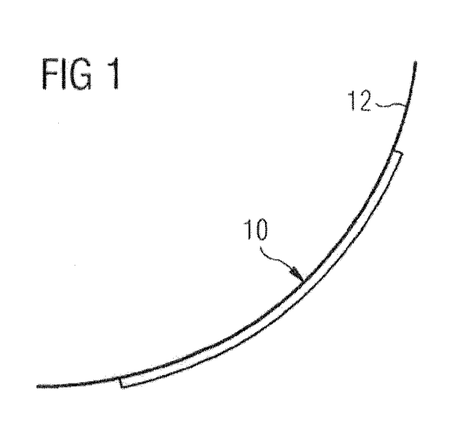
FIG. 1 shows a first embodiment of an aircraft outer skin heat exchanger.
Figure 2:
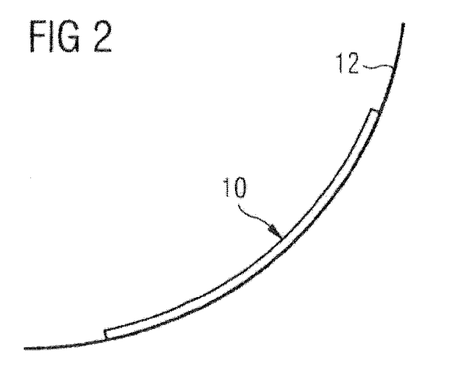
FIG. 2 shows a second embodiment of an aircraft outer skin heat exchanger.

FIGS. 1 and 2 show the basic construction and arrangement of an aircraft outer skin heat exchanger 10 on an aircraft fuselage. In the embodiment illustrated in FIG. 1, the outer skin heat exchanger 10 is fastened to an outer side, facing the aircraft surroundings, of an aircraft outer skin 12. In the embodiment according to FIG. 2, by contrast, the outer skin heat exchanger 10 is attached to an inner side, facing an interior space of the aircraft, of the aircraft outer skin 12. In both cases, the aircraft outer skin heat exchanger 10 is arranged in a lower fuselage region of the aircraft, in order to protect the outer skin heat exchanger 10 from solar heating. The outer skin heat exchanger 10 has a flat construction with a construction height of 5 mm to 30 mm.

Figure 3:
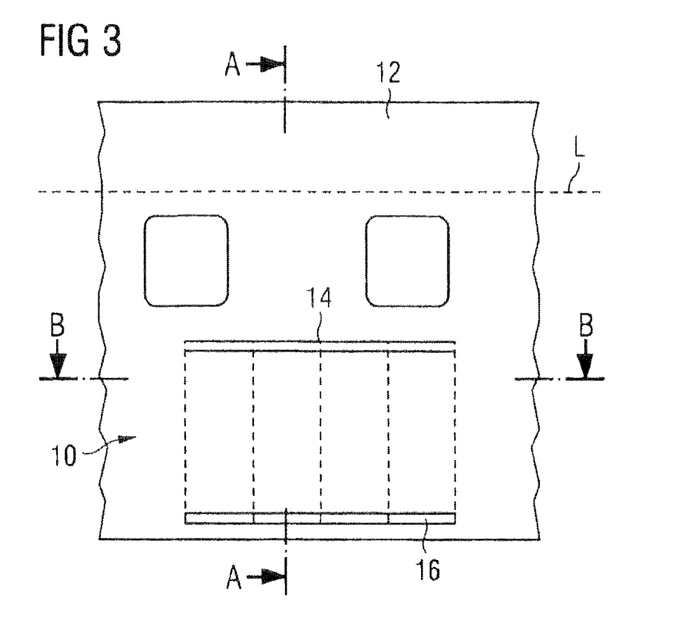
FIG. 3 shows a first embodiment of a cooling air inlet arrangement of an aircraft outer skin heat exchanger.
Figure 4:
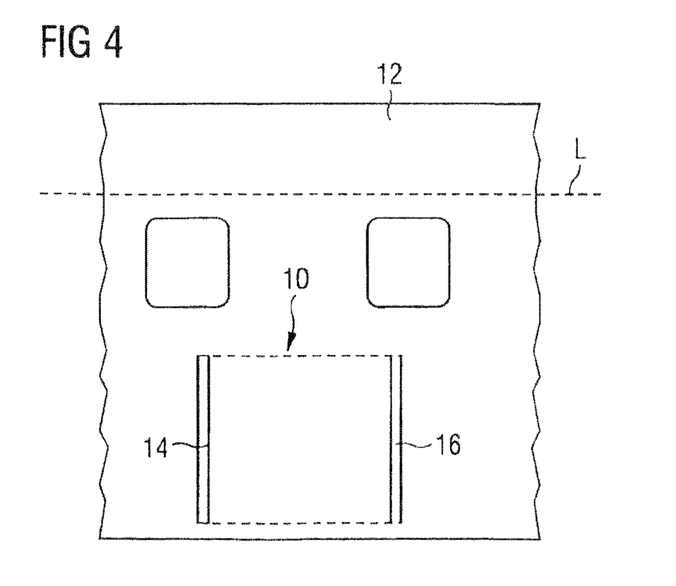
FIG. 4 shows a second embodiment of a cooling air inlet arrangement of an aircraft outer skin heat exchanger.

The aircraft outer skin heat exchanger 10 comprises a first cooling air inlet 14 of slit-shaped form and a second cooling air inlet 16 likewise of slit-shaped form. The cooling air inlets 14, 16 are between 10 mm and 30 mm wide. In the arrangement illustrated in FIG. 3, the cooling air inlets 14, 16 extend parallel to one another and parallel to a longitudinal axis L of the aircraft. In the arrangement according to FIG. 4, by contrast, the cooling air inlets 14, 16 arranged parallel to one another are oriented perpendicularly to the longitudinal axis L of the aircraft. In FIGS. 3 and 4, in each case only one first air inlet 14 and one second air inlet 16 are illustrated. If desired or required, however, the outer skin heat exchanger 10 can also be provided with more than two cooling air inlets.

Figure 5:
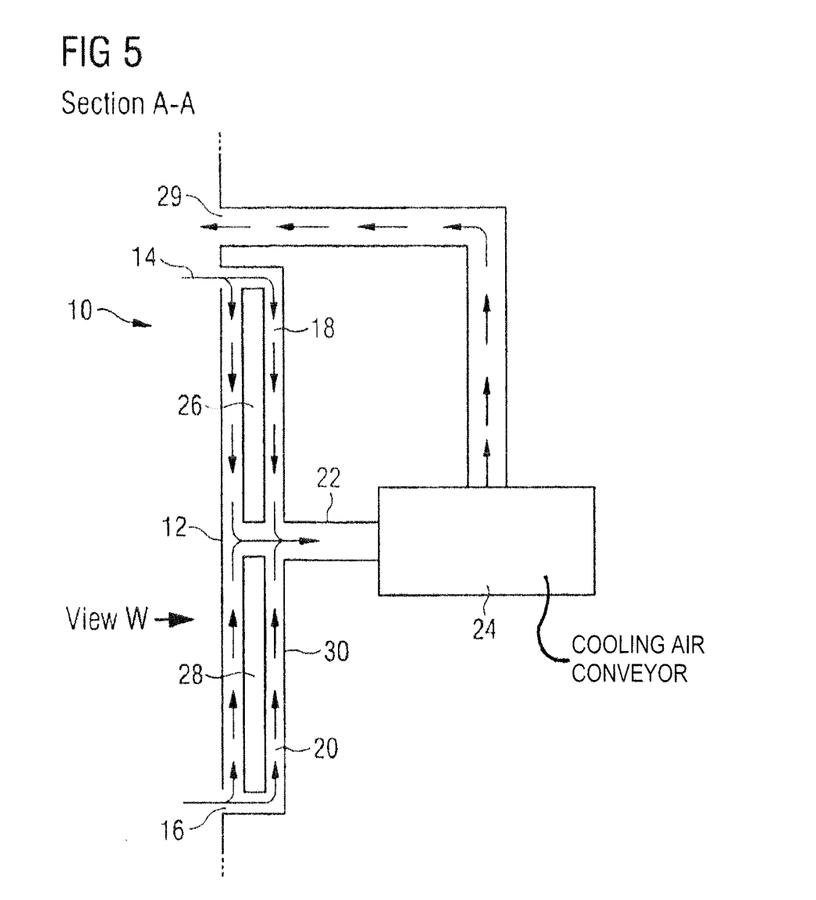
FIG. 5 shows a sectional representation of an aircraft outer skin heat exchanger, illustrating the cooling air flow through the aircraft outer skin heat exchanger.
Figure 6:
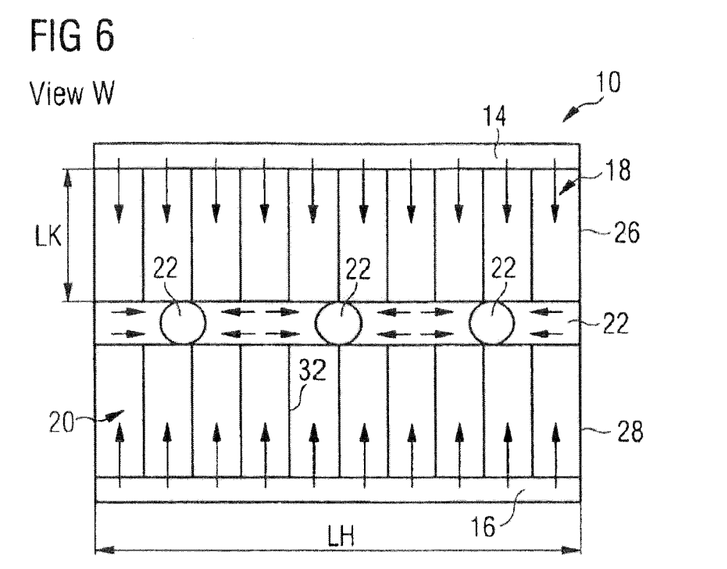
FIG. 6 shows a further sectional representation of an aircraft outer skin heat exchanger, illustrating the cooling air flow through the aircraft outer skin heat exchanger.
Figure 7:
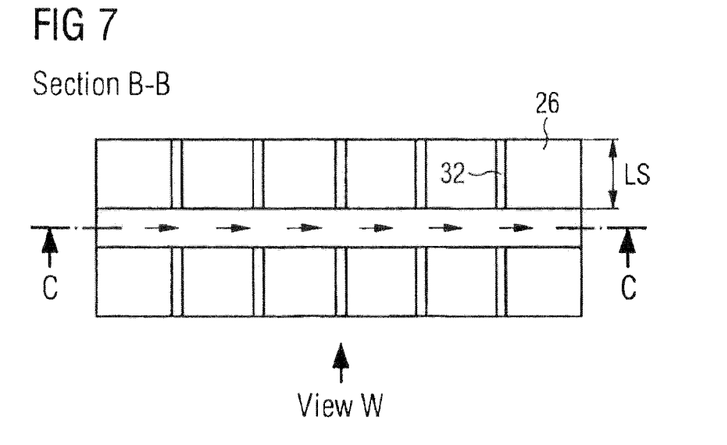
FIG. 7 shows a sectional representation, illustrating a heat carrier fluid flow guidance through an aircraft outer skin heat exchanger.

As can be seen from the sectional representation according to FIG. 5, the aircraft outer skin heat exchanger 10 further comprises a first cooling air duct section 18, connected to the first cooling air inlet 14, and a second cooling air duct section 20, connected to the second cooling air inlet 16. The first and the second cooling air duct section 18, 20 each open into a cooling air discharge duct 22, in which a cooling air conveying device 24 is arranged. The cooling air conveying device 24 conveys cool surrounding air via the cooling air inlets 14, 16 into the cooling air duct sections 18, 20.

In the first cooling air duct section 18, a first heat carrier fluid duct section 26 is arranged. Similarly, in the second cooling air duct section 20, a second heat carrier fluid duct section 28 is arranged. A heat carrier fluid to be cooled flows through the heat carrier fluid duct sections 26, 28. The heat carrier fluid can be gaseous or liquid. Furthermore, a two-phase heat carrier fluid can be guided through the heat carrier fluid duct sections 26, 28, which fluid condenses on flowing through the aircraft outer skin heat exchanger 10 owing to the release of thermal energy. The cooling air conveying device 24 conveys the cooling air stream, entering the first cooling air duct section 18 through the first cooling air inlet 14, in such a way through the first cooling air duct section 18 that the cooling air stream is subdivided by the first heat carrier fluid duct section 26, arranged in the first cooling air duct section 18, into two partial air streams which flow through the first cooling air duct section 18 substantially parallel to one another and in the same direction in the direction of the cooling air discharge duct 22.

Similarly, the cooling air conveying device 24 conveys the cooling air stream, entering the second cooling air duct section 20 through the second cooling air inlet 16, in such a way through the second cooling air duct section 20 that the cooling air stream is subdivided by the second heat carrier fluid duct section 26, arranged in the second cooling air duct section 20, into two partial cooling air streams which flow through the second cooling air duct section 20 substantially parallel to one another and in the same direction in the direction of the cooling air discharge duct 22. In other words, cooling air flows through the first and the second cooling air duct section 18, 20 in opposite directions. Both in the first and in the second cooling air duct section 18, 20, it is ensured by the guidance of the cooling air flow that cooling air flows around the heat carrier fluid duct sections 26, 28, arranged in the cooling air duct sections 18, 20, over a large area of at least two surfaces and the heat carrier fluid duct sections are thereby effectively cooled.

The air conveyed by the cooling air conveying device 24 through the cooling air duct sections 18, 20 and the cooling air discharge duct 22 is guided back into the aircraft surroundings via a cooling air outlet 29. If necessary, the flow guidance, illustrated in FIG. 5, of the cooling air through the cooling air inlets 14, 16, the cooling air duct sections 18, 20 and the cooling air outlet 29 can also be reversed, i.e. the cooling air conveying device 24 can also convey the cooling air via the cooling air outlet 29 and the cooling air discharge duct 22 into the cooling air duct sections 18, 20. The cooling air is then guided back into the aircraft surroundings via the cooling air inlets 14, 16.

As becomes clear from the representation according to FIG. 5, in the outer skin heat exchanger 10 shown in this representation, an outer surface of the cooling air duct sections 18, 20 is formed by the outer skin 12 of the aircraft. An inner surface of the cooling air duct sections 18, 20, by contrast, is formed by an inner wall 30, facing an interior space of the aircraft, of the aircraft outer skin heat exchanger 10. Such a configuration of the aircraft outer skin heat exchanger 10 is not only aerodynamically favourable, but also enables an arrangement of the cooling air conveying device 24 in an unpressurised region of the aircraft. Consequently, it is not necessary to route the cooling air discharge duct 22 into a pressurised region of the aircraft, so that costly sealing measures in this regard can be dispensed with.

As can be seen from FIGS. 5, 6, 7 and 9, the heat carrier fluid duct sections 26, 28 each comprise a flat pipe which is provided with cooling ribs 32 on its outer surfaces. The cooling ribs 32 extend substantially parallel to the flow direction of the cooling air through the cooling air duct sections 18, 20 (see FIGS. 6 and 7). Flat pipes are distinguished by good heat transfer properties. The flat pipes can have a flow cross-section of 1 mm to 5 mm×50 mm to 400 mm. Consequently, the flat pipes have a very small thickness (extent in the y-direction), a small height (extent in the z-direction) and, compared with these two dimensions, a considerably greater length (extent in the x-direction).

Figure 8:
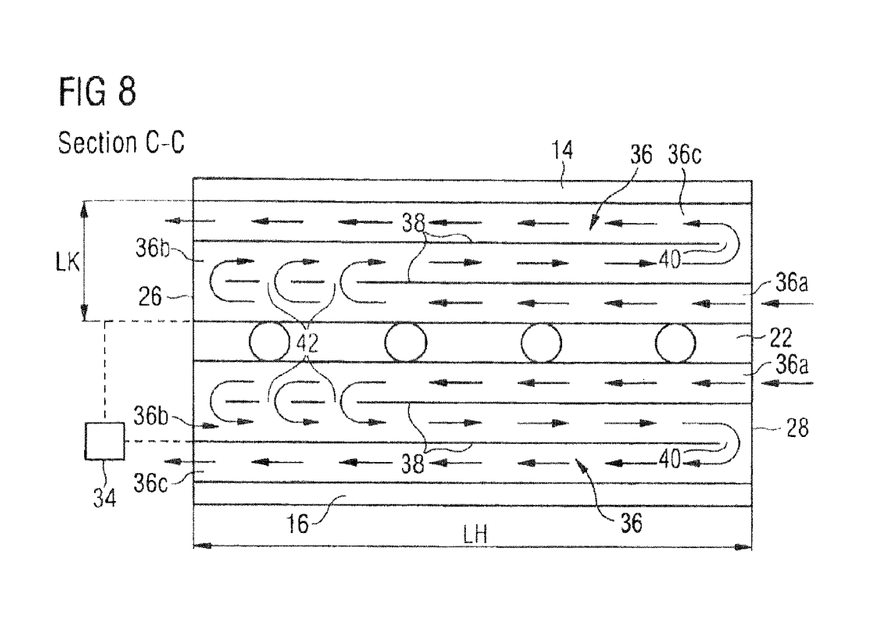
FIG. 8 shows a further sectional representation, illustrating the heat carrier fluid flow guidance through the aircraft outer skin heat exchanger.
Figure 9:
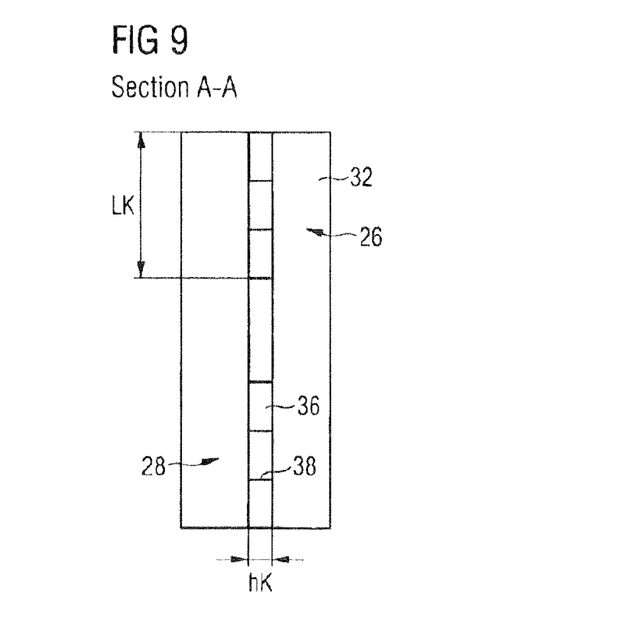
FIG. 9 shows a sectional representation of a heat carrier fluid duct section of an aircraft outer skin heat exchanger according to FIG. 8.
Figure 12:
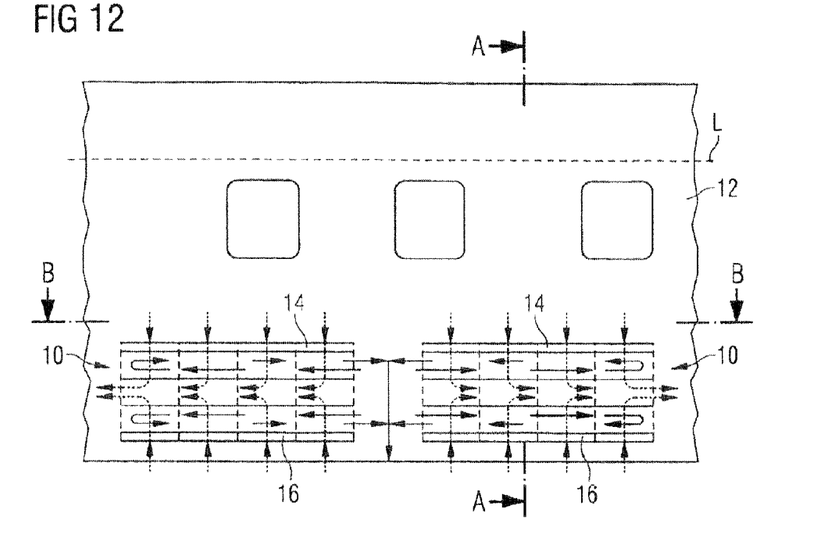
FIG. 12 shows a representation, illustrating the cooling air flow guidance and the heat carrier fluid flow in an aircraft outer skin heat exchanger.
Figure 13:
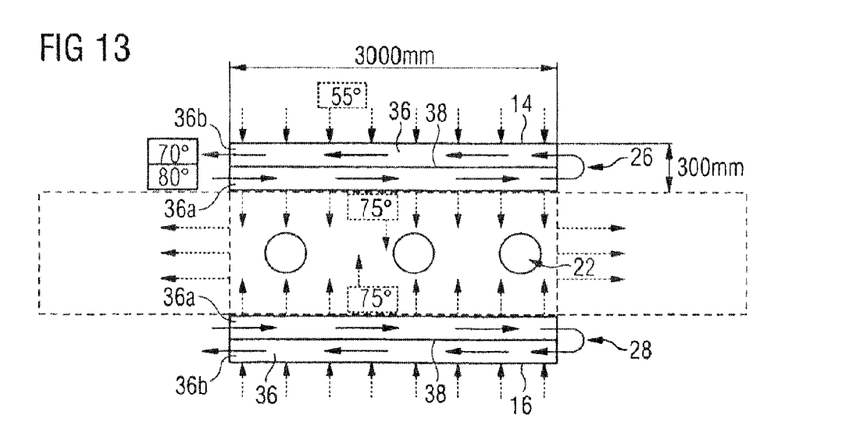
FIG. 13 shows a further representation, illustrating the cooling air flow guidance and the heat carrier fluid flow in an aircraft outer skin heat exchanger.

As becomes clear in particular from FIGS. 8, 12, and 13, the heat carrier fluid stream flowing through the heat carrier fluid duct sections 26, 28 is conveyed through the heat carrier fluid duct sections 26, 28, by a heat carrier medium conveying device 34 illustrated schematically in FIG. 8, substantially perpendicularly to the flow direction of the cooling air through the cooling air duct sections 18, 20. Moreover, the heat carrier fluid stream is diverted by 180°, on flowing through the heat carrier fluid duct sections 26, 28, a least once (see FIG. 13), if desired however also more often (see FIG. 8). In other words, a flow duct 36 of meander-shaped form is provided in the heat carrier fluid duct sections 26, 28, which duct enables the cooling air and the heat carrier fluid to be directed through the aircraft outer skin heat exchanger 10 in a cross-countercurrent flow.

The flow duct 36 is subdivided, by partition walls 38 provided in the heat carrier fluid duct sections 26, 28, into regions 36a-36c through which the heat carrier fluid flows in each case in the same direction. The partition walls 38 can be designed, as required, such that the flow diversion by 180° occurs in a defined flow-diverting region 40 of the flow duct 36. If desired, however, the partition walls 38 can also be provided with passages 42, enabling a flow diversion by 180° along a greater region of the flow duct 36 (see FIG. 8). The partition walls 38 provided in the heat carrier fluid duct sections, 26, 28 have not only a flow-controlling action, but also contribute towards increasing the pressure resistance of the heat carrier fluid duct sections 26, 28.

Figure 10:
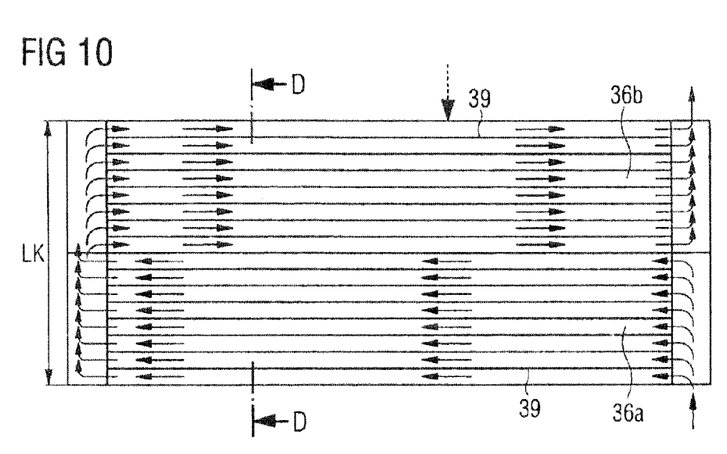
FIG. 10 shows a further sectional representation, illustrating an alternative heat carrier fluid flow guidance through the aircraft outer skin heat exchanger.
Figure 11:
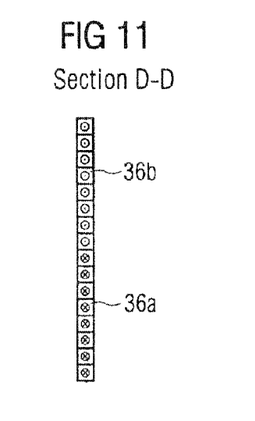
FIG. 11 shows a sectional representation of a heat carrier fluid duct section of an aircraft outer skin heat exchanger according to FIG. 10.

As illustrated in FIGS. 10 and 11, the regions 36a-36c of the flow duct 36 can be subdivided by further partition walls 39. By means of the further partition walls 39, the pressure resistance of the heat carrier fluid duct sections 26, 28 is further increased.

As can be seen from FIG. 13, the cooling air is heated, on flowing through the outer skin heat exchanger 10, for example from 55° C. to 75° C. The heat carrier fluid flowing through the heat carrier fluid duct sections 26, 28, by contrast, undergoes for example cooling from 80° C. to 70° C. on flowing through the outer skin heat exchanger 10. Furthermore, FIG. 13 illustrates two options for the cooling air discharge. On the one hand, the cooling air can be guided back into the aircraft surroundings via the cooling air discharge conduit 22. Alternatively or additionally to this, however, the cooling air can also be directed through a gap delimited by the aircraft outer skin 12 and the inner wall 30 of the aircraft outer skin heat exchanger 10. A cooling air conveying device 24 can then also be positioned at a greater distance, preferably in an unpressurised region of the aircraft. The air-guiding gap formed between the aircraft outer skin 12 and the inner wall 30 of the aircraft outer skin heat exchanger 10 can also be used to supply air to other systems or the cabin of the aircraft.

Figure 14:
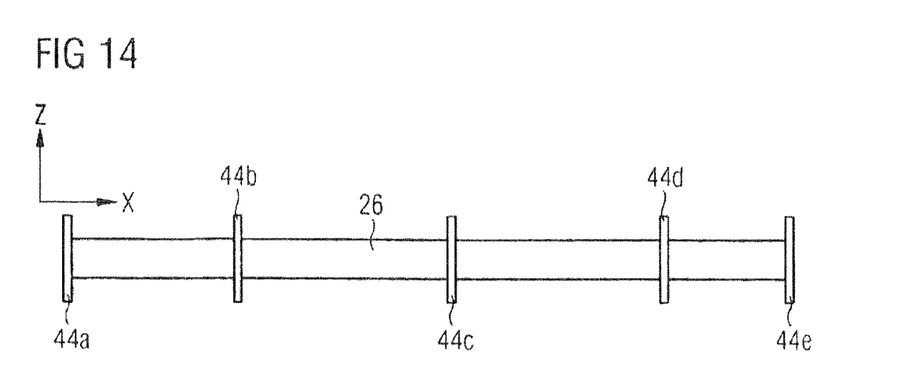
FIG. 14 shows a side view of a supported heat carrier fluid duct section of an aircraft outer skin heat exchanger.
Figure 15:
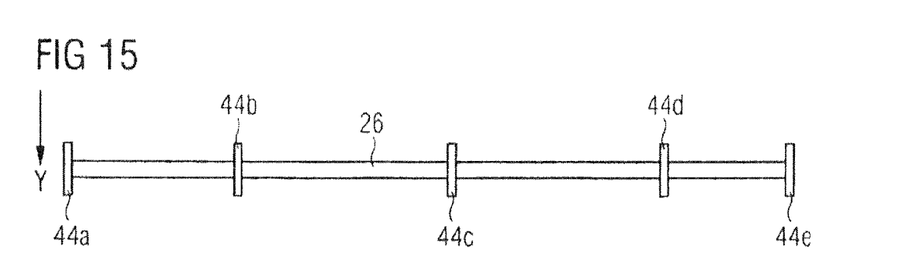
FIG. 15 shows a plan view of a supported heat carrier fluid duct section of an aircraft outer skin heat exchanger.

As shown in FIGS. 14 and 15, the heat carrier fluid duct sections 26, 28 in the outer skin heat exchanger 10 are supported via a plurality of bearing devices 44a to 44e on a structural component (not illustrated) of the aircraft. Only one central bearing device 44c is designed as a fixed bearing and has no degrees of freedom in the x-, y- or z-direction. The two lateral bearing devices 44a, 44e are designed as movable bearings. Intermediate bearings 44b, 44d provide support in the y-direction, but not in the x-direction. Their bearing capacity in the z-direction can be designed in accordance with specific requirements. The fixed bearing 44c is rotatably designed and mounted on a ball for example.

The invention claimed is:

1. An aircraft outer skin heat exchanger comprising:
   a first cooling air inlet disposed in an aircraft fuselage outer skin,
   a first cooling air duct section comprising a first duct portion and a second duct portion parallel to the first duct portion,
   a first heat carrier fluid duct section, arranged in the first cooling air duct section, and
   a cooling air conveyor which is configured to convey a cooling air stream through the first cooling air inlet and the first cooling air duct section such that the cooling air stream includes a first cooling air stream which flows through the first duct portion of the first cooling air duct section and a second cooling air stream which flows through the second duct portion of the first cooling air duct section, the first and second air streams flowing, in the respective first and second duct portions of the first cooling air duct section, parallel to one another in the same direction and toward a cooling air discharge duct,
   wherein an outer surface of the first cooling air duct section is formed by an outer skin of an aircraft and an inner surface of the first cooling air duct section is formed by an inner wall of the aircraft outer skin heat exchanger, the inner wall facing an interior space of the aircraft, and
   wherein the first cooling air stream flows through the first duct portion of the first cooling air duct section between the outer skin and the first heat carrier fluid duct section and the second cooling air stream flows through the second duct portion of the first cooling air duct section between the first heat carrier fluid duct section and the inner wall.

2. The aircraft outer skin heat exchanger according to claim 1, further comprising:
   a second cooling air inlet disposed in an aircraft fuselage outer skin,
   a second cooling air duct section comprising a first duct portion and a second duct portion parallel to the first duct portion, and
   a second heat carrier fluid duct section, arranged in the second cooling air duct section, the cooling air conveyor being configured to convey a cooling air stream through the second cooling air inlet and the second cooling air duct section such that the cooling air stream is subdivided by the second heat carrier fluid duct section, arranged in the second cooling air duct section, into two partial cooling air streams which flow through the second cooling air duct section substantially parallel to one another and in the same direction.

3. The aircraft outer skin heat exchanger according to claim 2, wherein at least one of the first and the second cooling air inlet is of slit-shaped form and extends, in the state of the aircraft outer skin heat exchanger when mounted in an aircraft, in particular parallel to one another, parallel or perpendicularly to a longitudinal axis of the aircraft.

4. The aircraft outer skin heat exchanger according to claim 2, wherein an outer surface of the second cooling air duct section is formed by the outer skin of the aircraft and an inner surface of the second cooling air duct section is formed by the inner wall, facing an interior space of the aircraft, of the aircraft outer skin heat exchanger.

5. The aircraft outer skin heat exchanger according to claim 2, further comprising a heat carrier fluid conveyor configured to convey heat carrier fluid flowing through at least one of the first and the second heat carrier fluid duct section substantially perpendicularly to the flow direction of the cooling air through the at least one of the first and the second cooling air duct section.

6. The aircraft outer skin heat exchanger according to claim 2, further comprising a flow duct, formed in at least one of the first and the second heat carrier fluid duct section, for the heat carrier fluid flow flowing through the at least one of the first and the second heat carrier fluid duct section, of meander-shaped form and enabling at least a single diversion by 180° of the heat carrier fluid flow flowing through the at least one of the first and the second heat carrier fluid duct section.

7. The aircraft outer skin heat exchanger according to claim 2, wherein at least one of the first and the second heat carrier fluid duct section comprises at least one flat pipe which is provided on its outer surfaces with cooling ribs which extend in particular substantially parallel to the flow direction of the cooling air through the at least one of the first and the second cooling air duct section.

8. The aircraft outer skin heat exchanger according to claim 2, further comprising a plurality of bearing devices structured to support at least one of the first and the second heat carrier fluid duct section on a structural component of the aircraft, only one of the bearing devices being configured as a fixed bearing and the other bearing devices being configured as movable bearings, the bearing device configured as a fixed bearing.

9. The aircraft outer skin heat exchanger according to claim 2, wherein the first cooling air duct section and the second cooling air duct section are connected to the cooling air discharge duct.

10. The aircraft outer skin heat exchanger according to claim 1, wherein the first and second cooling air streams are physically separated from one another.

11. The aircraft outer skin heat exchanger according to claim 1, wherein substantially all air from the first cooling air inlet is configured to be conveyed through the cooling air conveyor.

12. An aircraft cooling system, comprising an aircraft outer skin heat exchanger comprising:
 a first cooling air inlet disposed in an aircraft fuselage outer skin,
 a first cooling air duct section comprising a first duct portion and a second duct portion parallel to the first duct portion,
 a first heat carrier fluid duct section, arranged in the first cooling air duct section, and
 a cooling air conveyor which is configured to convey a cooling air stream through the first cooling air inlet and the first cooling air duct section such that the cooling air stream includes a first cooling air stream which flows through the first duct portion of the first cooling air duct section and a second cooling air stream which flows through the second duct portion of the first cooling air duct section, the first and second air streams flowing, in the respective first and second duct portions of the first cooling air duct section, parallel to one another in the same direction and toward a cooling air discharge duct,
 wherein an outer surface of the first cooling air duct section is formed by an outer skin of an aircraft and an inner surface of the first cooling air duct section is formed by an inner wall of the aircraft outer skin heat exchanger, the inner wall facing an interior space of the aircraft, and
 wherein the first cooling air stream flows through the first duct portion of the first cooling air duct section between the outer skin and the first heat carrier fluid duct section and the second cooling air stream flows through the second duct portion of the first cooling air duct section between the first heat carrier fluid duct section and the inner wall.

* * * * *